April 26, 1949.    J. A. LE VASSEUR    2,468,499
FLUID DISPENSER ADAPTED TO PERFORATE CONTAINERS
Filed Oct. 25, 1943    2 Sheets-Sheet 1
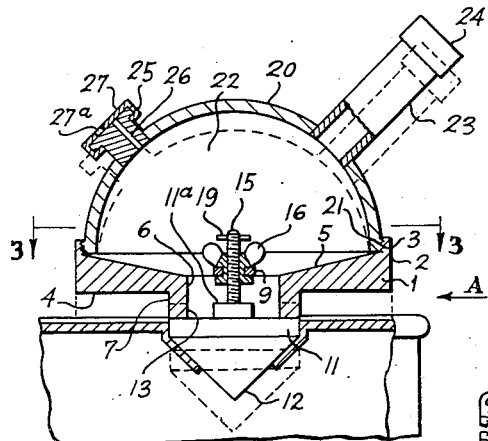
Fig. 1
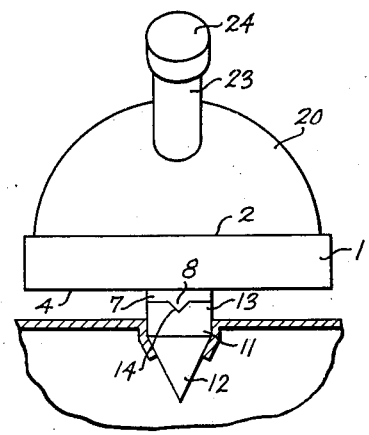
Fig. 2
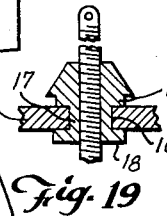
Fig. 19
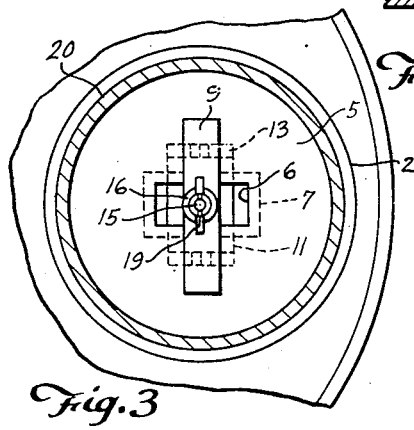
Fig. 3
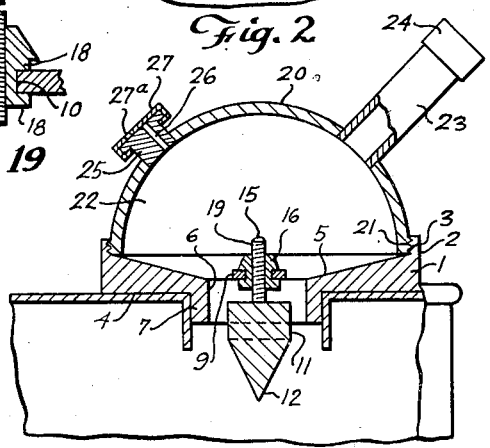
Fig. 4
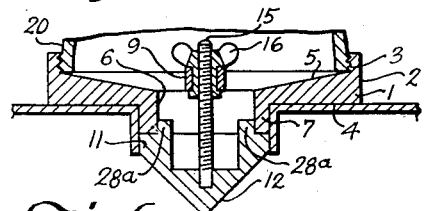
Fig. 6
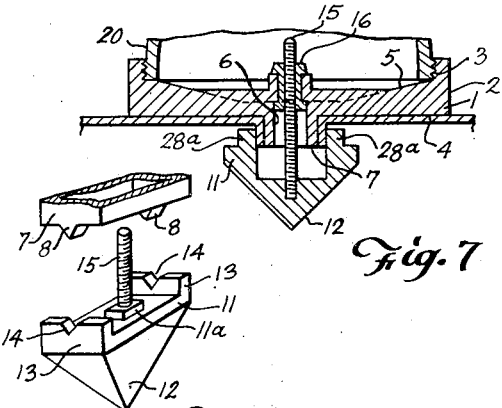
Fig. 7
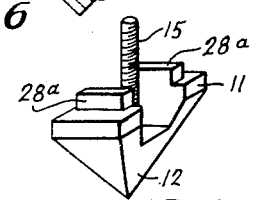
Fig. 8
Fig. 5
INVENTOR
J. A. LE VASSEUR
By: Fetherstonhaugh & Co.
ATT'YS

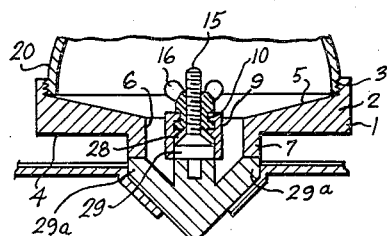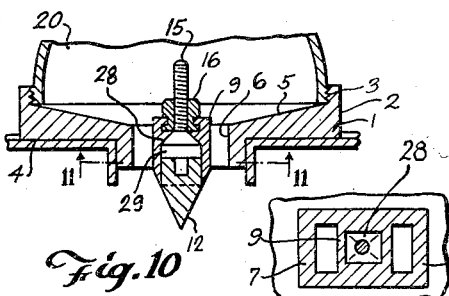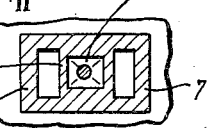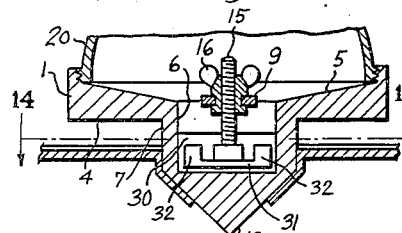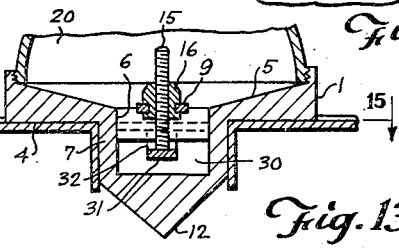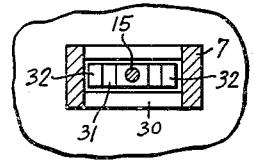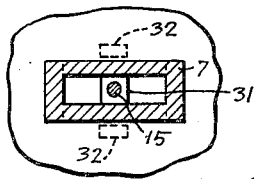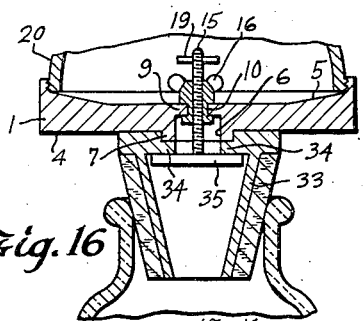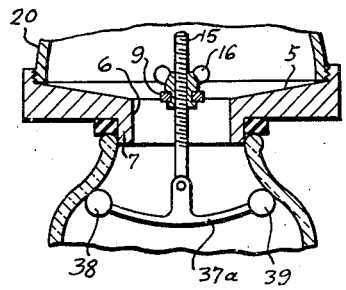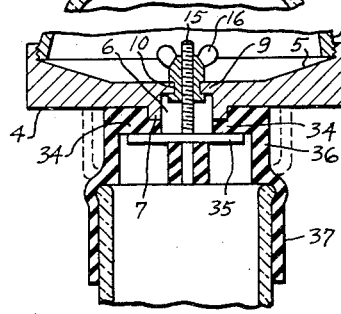

Patented Apr. 26, 1949

2,468,499

UNITED STATES PATENT OFFICE 2,468,499

FLUID DISPENSER ADAPTED TO PERFORATE CONTAINERS

Joseph A. Le Vasseur, Toronto, Ontario, Canada

Application October 25, 1943, Serial No. 507,543

6 Claims. (Cl. 222—90)

My invention relates to improvements in sanitary liquid dispensers of the type disclosed in my United States Patent No. 2,307,691, dated January 5, 1943.

An object of the present invention is to devise a more positive means for gripping the punched wall of the dispenser top between the circular base of the dispenser and the punching blade which at the same time will not jam when brought to the gripping position and is therefor free to easily disengage when it is desired to detach the dispenser from the can.

A further object is to devise means for positively holding the punching blade in position in relation to the rectangular sleeve of the dispenser base both in the punching and dispensing position.

In the construction disclosed in my above United States patent the side walls or long walls of the elongated sleeve of the dispenser base are formed with edge recesses located centrally thereof into which a portion of the punching blade fits when the device is in the dispensing position. It will be readily understood that when the punched orifice is formed a lip of metal is turned down all around the punched orifice which lip will extend across each of the above referred to recesses of my prior patent so that when the punching blade is drawn upward into such recesses to extend transversely of the sleeve it engages the turned lip and crushes it at that point whereby a recess is formed in the lip in which the blade is forced and tends to stick, preventing its easy withdrawal and at the same time preventing the blade tightly gripping the wall of the can top.

To overcome this defect the blade is recessed at each side of its centre so that when it is in the gripping position the lip at each side of the punched opening enters the recesses premitting the engagement of the top of the punch blade at its ends with the under face of the can top to force it against the dispenser base. At the same time the centre portion of the punch blade between recesses thereof fits the sleeve to hold the blade positively in the dispensing position. Further, the gripping portions of the punch blade are provided with recesses into which projections depending from the end walls of the sleeve fit to hold the punching blade in the punching position as explained more particularly in the following specification.

In the drawings:

Fig. 1 is a sectional view through my dispenser applied to a can showing the punching blade in full and in the position it assumes during punching in full lines and in final punching position in dotted lines.

Fig. 2 is a view showing the dispenser in elevation and viewed in the direction of arrow A, see Fig. 1.

Fig. 3 is a plan view on line 3—3, Fig. 1.

Fig. 4 is a sectional view similar to Fig. 1, but showing the punch blade in the can top gripping position.

Fig. 5 is a perspective detail of the punching blade and the coacting portion of the dispenser sleeve.

Fig. 6 and 7 are sectional views of a modified form showing the punch blade respectively in the punching and gripping position.

Fig. 8 is a perspective detail of the punch blade employed in the modification shown in Figs. 6 and 7.

Figs. 9, 10 and 11 illustrate a further modification.

Figs. 12 to 15 illustrate another modified form, Fig. 14 being a sectional view on line 14—14 Fig. 12, and Fig. 15 being a sectional view on line 15—15 Fig. 13.

Figs. 16 to 18 show means whereby my dispenser may be connected to the stopper of a bottle or like container.

Fig. 19 is a sectional detail of the threaded stem, wing nut and bridge and means for holding the wing nut stationary in relation to the bridge.

Referring first to Figs. 1–4.

I is a circular base having a projecting flange 2 extending around its upper surface at the periphery thereof, said flange being formed with an internal thread 3. The base I is formed with a flat bottom 4 and has a concave upper surface 5 which slopes from its outer edge downwardly to a central elongated slot 6 extending through the base I. The slot 6 is preferably rectangular and a sleeve 7 which is the same shape as the slot registers therewith and depends downwardly from the bottom of the base. A projection 8 depends downwardly from the centre of each end wall of the sleeve as is clearly shown in Figs. 2 and 5. A cross piece 9 extends transversely of the slot 6 midway of the length thereof, being mounted on the surface 5 to form a bridge straddling the slot 6. The bridge is provided with a central orifice 10.

A punch blade, the base portion 11 of which is elongated to conform to the shape of the outer periphery of the sleeve, has depending from it a cutting point 12 located centrally beneath the portion 11. The base portion is provided with diametrically opposed upwardly extending cross ribs or arms 13 formed preferably by recessing the base inwardly, said ribs or arms being located, in the punching position, beneath the corresponding end wall of the sleeve 7 and is provided with central recesses 14, into each of which a projection 8 fits to hold the punch in punching position.

A threaded stem 15 extends upwardly from the blade 11 through the slot 6 and through the orifice 10 of the bridge 9. A wind nut 16 is threaded on the upper end of the stem against the bridge 9. The wing nut is provided with a sleeve 17 which extends through the orifice 10 and is provided with a collar 18 at each end thereof to prevent the wing nut moving up or down when it is turned so that the stem 15 must move up or down when the nut is rotated. A pointer 19 located at the upper end of the stem is adapted to indicate the position of the blade 11 with respect to the sleeve 7.

A cover 20 is preferably dome-shaped having threads 21 on its outer surface at the edge thereof and is adapted to be screwed into the base 1 engaging the threads 3 of the flange 2. When assembled the cover and base form a chamber 22. A comparatively long spout 23 projects outwardly from the cover and has a cap 24 removably mounted on its outer end while a plug 25 is fitted to the cover, said plug having an air passage 26 extending therethrough. A cap 27 is rotatably mounted on its outer end and is provided with an orifice 27ª formed therein adapted to be brought into registry with the passage when the cap is turned.

When it is desired to attach the dispenser to the can the blade 11 is turned to a position longitudinally of the sleeve 7 with the longitudinal axis of each aligned with one another and the recesses 14 are drawn upwardly into engagement with the projections 8 by turning the wing nut 16 on the stem 15 (see Figs. 1 and 2). Then the blade is forced through the top of the can making a hole into which the sleeve 7 snugly fits, since the sides and ends of the latter are flush with the sides and ends of the blade. Next, the nut 16 is turned to allow the blade to drop downwardly sufficiently to permit the recesses 14 clearing the projections 8, at which time the stem is rotated a quarter turn. Then the nut 16 is again turned to draw the ribs 13 into engagement with the bottom of the can top to clamp such top between the upper surfaces of the ribs and the face 4 of the dispenser base thereby forming a tight joint and fastening the dispenser to the can, the side walls of the sleeve and the downwardly punched metal lip of the can top being straddled by the arms or ribs 13 and disposed with the re-recessed portion between said arms and the stem 15. At the same time the squared central portion 11ª fits into the sleeve 7 to assure that the punching member is disposed so that its longitudinal axis is at right angles to the longitudinal axis of the sleeve.

When the cap 24 is removed from the spout 23 and the cap 27 turned to bring the orifice 27ª into registry with the air passage 26, the contents of the can may be poured out through the dispenser since the spout is now in communication with the interior of the can through the chamber 22, the slot 6 and the sleeve 7.

The blade 11 divides the sleeve into two sections so that as the can is tipped in the direction of the spout the liquid contents run through the portion of the sleeve below the blade and the air entering through the passage 27 passes into the can through the portion of the sleeve above the blade.

Referring to Figs. 6, 7 and 8 in this form the blade is provided with diametrically opposed cross ribs or arms 28ª one disposed adjacent each end of the blade, the parts being so proportioned that these ribs or arms fit within the sleeve adjacent each end when the device is in the punching position as shown in Fig. 6 and exteriorly of and straddling the sleeve when the device is in the clamping position, that is, the position for securing the dispenser to the can. Such securing operation is performed by turning the punching blade to a position at right angles to the punching position. To do this the nut 16 is turned on the stem 15 to carry the stem downward to clear the ribs 28a and the sleeve 7 and then in the opposite direction to carry the punching blade and dispenser bottom 4 into clamping position as shown in Fig. 7.

In Figures 9, 10 and 11 another modification is shown in which the bridge 9 is provided with a rectangular recess 28 the upper portion of which is tapered to the orifice 10 and a rectangular enlargement 29 formed on the stem 15, the upper portion of which is tapered to correspond to the taper of the recess 28. By this means the punch blade is locked in both its cutting and clamping position by the raising and lowering of the stem 15 as previously described. The base of the punch blade is likewise provided with opposed arms 29a which are caused to straddle the sleeves 7 and the upwardly projecting lip punched from the container to secure the dispenser in the mounted position as described in connection with the previous constructions.

In Figures 12 to 15 a further modification is shown. In this form the sleeve and punch blade are formed integral, an orifice 30 being formed in each long wall of the elongated sleeve. On the stem 15 an arm 31 is secured having upwardly extending end projections 32. When in the punching position the arm is positioned longitudinally of the slot and is therefore out of operation but when in the clamping position it is turned at right angles so that the projections engage the can top as shown in Fig. 13 in a similar manner to that previously described.

In Fig. 16 a cork or stopper 33 fits the mouth of a bottle. The interior of the stopper is hollow and provided with overhanging lips 34 which are engaged by a cross arm 35 secured to the stem 15 which serves to clamp the dispenser base 1 to the stopper when the cross arm is set transversely of the dispenser slot 6 to extend beneath the lips 34.

In Fig. 17 the stopper is formed by a rubber sleeve 36, the lower wall portions 37 of which are turned down from the dotted position to engage the neck of the bottle. This form of stopper is also provided with inwardly extending lips engaged by a cross bar 35 in the same manner as described in connection with Fig. 16.

In Fig. 18 is shown an alternative form of device for connecting a dispenser to a bottle consisting of an arm 37ª pivoted to the lower end of the stem 15, having weighted ends 38 and 39. When the device is inserted in the bottle mouth the heavy end 38 is swung up against the stem. The device after passing through the bottle mouth is freed and the arm swings to the horizontal and is then drawn up by the wing nut 16 to engage beneath the shoulder of the bottle as shown.

What I claim as my invention is:

1. In a fluid dispenser of the class described adapted to perforate a container wall, a base, a sleeve extending downwardly from said base, a punch blade having a base portion, a punching point extending downwardly from said base portion of said punch blade, ribs extending upwardly from said base portion of said punch blade, said base having a bore defining the inner surfaces of said sleeve, said bore having major and minor transverse dimensions, a threaded stem centrally disposed on, and extending upwardly from said base portion, a bridge freely mounted on said stem, and a wing nut on said stem designed to provide engagement of said bridge with the upper surfaces of said base to mount said punch blade in a punching position when said ribs engage the lower extremities of said sleeve, and to provide engagement of the container wall between the lower surface of said base and said ribs after said wall has been perforated by said punch blade and after rotative adjustment of said blade, whereby said dispenser is fastened to the wall of said container.

2. In a fluid dispenser adapted to perforate containers as claimed in claim 1, means for positively locating and holding said blade in punching position including projections depending downwardly from said sleeve at opposite sides thereof, said ribs being recessed to receive said projections of said sleeve.

3. In a fluid dispenser adapted to perforate containers as claimed in claim 1, means for positively locating and holding said blade in said punching position including inwardly tapered projections depending downwardly from said sleeve on opposite sides thereof, said ribs having downwardly tapered recesses designed to receive said projections of said sleeve.

4. In a fluid dispenser of the class described adapted to perforate a container wall, a base, a sleeve extending downwardly from said base, a punching member having a base portion, a punching point extending downwardly from said base portion of said punching member, ribs extending upwardly from said base portion of said punching member, said base having a bore defining the inner surfaces of said sleeve, said bore having major and minor transverse dimensions, a stem centrally disposed on, and extending upwardly from said base portion, a bridge freely mounted on said stem, and means on said stem designed to provide engagement of said bridge with the upper surfaces of said base to mount said punching member in a punching position when said ribs engage the lower extremities of said sleeve, and to provide engagement of the container wall between the lower surface of said base and said ribs after said wall has been perforated by said punching member and after rotative adjustment of said member, whereby said dispenser is fastened to the wall of said container.

5. In a fluid dispenser adapted to perforate containers as claimed in claim 4, means for positively locating and holding said punching member in punching position including projections depending downwardly from said sleeve at opposite sides thereof, said ribs being recessed to receive said projection of said sleeve.

6. In a fluid dispenser adapted to perforate containers as claimed in claim 4, means for positively locating and holding said punching member in said punching position including inwardly tapered projections depending downwardly from said sleeve on opposite sides thereof, said ribs having downwardly tapered recesses designed to receive said projections of said sleeve.

JOSEPH A. LE VASSEUR.

REFERENCES CITED

The following references are of record in the file of this patent:

UNITED STATES PATENTS

| Number | Name | Date |
| --- | --- | --- |
| 680,750 | Wintherlich | Aug. 20, 1901 |
| 700,043 | Heard | May 13, 1902 |
| 1,401,968 | Dorner | Jan. 3, 1922 |
| 1,485,579 | Wyatt | Mar. 4, 1924 |
| 1,520,502 | Lundblad | Dec. 23, 1924 |
| 1,773,019 | Wickers | Aug. 12, 1930 |
| 2,001,481 | Abbott | May 14, 1935 |
| 2,237,810 | Casper | Apr. 8, 1941 |
| 2,307,691 | Le Vasseur | Jan. 5, 1943 |

FOREIGN PATENTS

| Number | Country | Date |
| --- | --- | --- |
| 343,014 | France | Sept. 23, 1904 |
| 168,536 | Great Britain | Sept. 8, 1921 |
| 426,896 | Great Britain | Apr. 11, 1935 |